United States Patent
Andersen et al.

(10) Patent No.: US 9,583,981 B2
(45) Date of Patent: Feb. 28, 2017

(54) ARMATURE ASSEMBLY, ARMATURE RING SEGMENT AND AN ARMATURE HANDLING APPARTUS FOR A GENERATOR HAVING INSERTION INTERFACE ELEMENTS FOR MOUNTING TO COMPLEMENTARY RECEIVING INTERFACE ELEMENTS

(71) Applicant: SIEMENS AKTIENGESELLSCHAFT, München (DE)

(72) Inventors: Torben Peter Andersen, Taastrup (DK); Alan Hansen, Rødovre (DK); Stefan Maroti, Silkeborg (DK); Klaus Thaarup, Greve (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/364,341

(22) PCT Filed: Feb. 12, 2013

(86) PCT No.: PCT/EP2013/052770
§ 371 (c)(1),
(2) Date: Jun. 11, 2014

(87) PCT Pub. No.: WO2013/120842
PCT Pub. Date: Aug. 22, 2013

(65) Prior Publication Data
US 2014/0339951 A1    Nov. 20, 2014

(30) Foreign Application Priority Data
Feb. 14, 2012   (EP) .................................. 12155427

(51) Int. Cl.
*H02K 1/12*     (2006.01)
*H02K 1/14*     (2006.01)
(Continued)

(52) U.S. Cl.
CPC ............... *H02K 1/12* (2013.01); *H02K 1/148* (2013.01); *H02K 15/02* (2013.01);
(Continued)

(58) Field of Classification Search
CPC .......... H02K 1/12; H02K 1/187; H02K 15/02; H02K 15/024
(Continued)

(56) References Cited

U.S. PATENT DOCUMENTS 3,466,518 A * 9/1969 Aylikci .................. H02K 37/04
310/156.42
8,816,546 B2 * 8/2014 Bywaters ................. H02K 1/16
310/216.049
(Continued)

FOREIGN PATENT DOCUMENTS

CN     101043154 A    9/2007
CN     201904662 U    7/2011
(Continued)

OTHER PUBLICATIONS

Extended European Search Report for European Application No. 12155427.3, mailed on Jan. 22, 2013.
(Continued)

*Primary Examiner* — Joshua Benitez-Rosario
*Assistant Examiner* — Rashad Johnson
(74) *Attorney, Agent, or Firm* — Schmeiser Olsen & Watts LLP

(57) ABSTRACT

An armature assembly comprising an armature body and a number of armature ring segments mounted on the armature body, wherein the armature assembly comprises a number of insertion interface elements and a number of complementary receiving interface elements for mounting an armature ring segment onto the armature body; whereby an insertion interface element is realized to engage with a complemen-
(Continued)

tary receiving interface element in a direction essentially parallel to a rotation axis of the armature; and wherein an insertion interface element is formed as an integral part of the armature body or as an integral part of an armature ring segment. A method of assembling an armature is also described, and a wind turbine comprising such an armature assembly is provided.

11 Claims, 3 Drawing Sheets

(51) Int. Cl.
*H02K 15/02* (2006.01)
*H02K 7/18* (2006.01)

(52) U.S. Cl.
CPC ......... *H02K 15/024* (2013.01); *H02K 7/1838* (2013.01); *Y02E 10/725* (2013.01); *Y10T 29/49009* (2015.01)

(58) Field of Classification Search
USPC ............. 310/89, 216, 254.1; 29/596; 290/55
See application file for complete search history.

(56) References Cited

U.S. PATENT DOCUMENTS

| | | | |
|---|---|---|---|
| 9,246,361 B2 * | 1/2016 | Yang | H02K 1/24 |
| 2002/0113518 A1 | 8/2002 | Hsu | |
| 2004/0061410 A1 * | 4/2004 | Ando | H02K 1/148 |
| | | | 310/216.113 |
| 2007/0096584 A1 * | 5/2007 | Erfanfar | H02K 1/26 |
| | | | 310/216.015 |
| 2010/0141059 A1 * | 6/2010 | Nishimura | H02K 1/02 |
| | | | 310/44 |
| 2011/0248592 A1 * | 10/2011 | Siegfriedsen | H02K 1/2753 |
| | | | 310/156.08 |
| 2011/0272950 A1 | 11/2011 | Stiesdal | |
| 2011/0285138 A1 | 11/2011 | Asanuma et al. | |

FOREIGN PATENT DOCUMENTS

| | | | |
|---|---|---|---|
| CN | 102237727 A | 11/2011 | |
| DE | 3027987 C2 | 8/1984 | |
| DE | EP 2385609 A1 * | 11/2011 | ............. H02K 1/148 |
| EP | 1014536 A2 | 6/2000 | |
| JP | 60023225 A | 2/1985 | |

OTHER PUBLICATIONS

International Search Report and Written Opinion dated Jun. 13, 2013; PCT/EP2013/052770; International File Date: Feb. 12, 2013; 10 pgs.

* cited by examiner

ARMATURE ASSEMBLY, ARMATURE RING SEGMENT AND AN ARMATURE HANDLING APPARTUS FOR A GENERATOR HAVING INSERTION INTERFACE ELEMENTS FOR MOUNTING TO COMPLEMENTARY RECEIVING INTERFACE ELEMENTS

CROSS-REFERENCE TO RELATED APPLICATIONS

This application claims priority to PCT Application No. PCT/EP2013/052770, having a filing date of Feb. 12, 2013, based off of EP Application No. 12155427.3, having a filing date of Feb. 14, 2012, the entire contents of which are hereby incorporated by reference.

FIELD OF TECHNOLOGY

The following relates to an armature assembly, an armature ring segment, an armature body, and a method of assembling an armature.

A generator for a large electrical machine such as a multi-megawatt wind turbine generator has a relatively large diameter and can easily weigh in excess of ten tons or more. The physical dimensions and weight of such a large generator pose problems during its assembly. Handling of the heavy, unwieldy and vulnerable components is complex and time-consuming, and is also hazardous, so that strict safety measures must be adhered to. This adds considerably to the overall time and cost required for the assembly of a direct-drive generator.

For example, in assembly of the armature (usually the stator), ring segments are mounted onto the outside circumference of the armature. Each ring segment bears a set of windings of the coil arrangement of the armature. The ring segments must be handled with care to avoid damaging them. However, a ring segment for a large armature can weigh hundreds of kilos, making it difficult to maneuver into position ready for mounting to an armature bedframe, which usually comprises a front plate and a back plate mounted to a hollow shaft. A ring segment generally comprises several coil sections with windings wrapped in isolating material, and end-sections shaped for connection to end-sections of neighboring ring segments. The ring segment must be suspended or held in place until it is mounted to the bedframe. Extreme care must be taken when the ring segment is suspended during transport so that the vulnerable parts such as insulation or connectors are not damaged or bent, and so that the isolating material is not damaged. Furthermore, care must be taken to avoid damage or distortion of bedframe connecting means that are necessary for connecting the ring segment to the stator bedframe, otherwise an exact mounting is not possible. Damage to any of these elements results in expensive repair work and holds up production.

In related methods of assembling a stator, the stator bedframe is usually arranged in a vertical orientation, i.e. the rotation axis of the stator is vertical. To mount a ring segment to the stator, it is held in place by a lifting or grasping mechanism while a technician inserts bolts through openings in connecting elements of the ring segment and the stator body and tightens these. However, each ring segment must be fastened to the stator body using many such fasteners, and use of the lifting mechanism is therefore blocked until that ring segment has been connected to the stator. This makes the assembly process slow, and therefore also expensive.

SUMMARY

It is therefore an advantage of the invention to provide a straightforward, robust and more economical way of assembling a generator armature for a wind turbine.

According to the disclosure, the armature assembly comprises an armature body and a number of armature ring segments mounted on the armature body, wherein the armature assembly comprises a number of insertion interface elements and a number of complementary receiving interface elements for mounting an armature ring segment onto the armature body; whereby an insertion interface element is realized to engage with a complementary receiving interface element in a direction essentially parallel to a rotation axis of the armature; and wherein an insertion interface element is formed as an integral part of the armature body or as an integral part of an armature ring segment.

An advantage of the armature assembly according to the invention is that the interface elements allow the ring segment to be connected to the armature body without the need for any fasteners, at least at this stage of assembly. This connection can be final, i.e. additional fasteners are not necessary. For example, the entire assembly with all ring segments in place could be wrapped in a band such as a fiberglass band. Alternatively, the connection given by the interface elements can be regarded as an initial or preliminary connection, allowing a ring segment to be securely "suspended" in place, so that a lifting mechanism can be used for a next ring segment while a technician places additional fasteners between the ring segment and the armature body.

According to the disclosure, the armature ring segment comprises least one insertion interface element realized to be inserted into a complementary receiving interface element of an armature body in a direction essentially parallel to a rotation axis of the armature, which insertion interface element is formed as an integral part of the armature ring segment.

According to the disclosure, the armature body comprises a number of receiving interface elements for receiving a number of complementary insertion interface elements of such armature ring segments, such that the armature ring segments are mounted to the armature body by means of the complementary interface elements.

According to the invention, the armature handling apparatus comprises an armature holding apparatus realized to hold such an armature body such that a rotation axis of the armature body is essentially vertical; and a turning means realized to turn the armature body about the rotation axis to bring a free ring segment portion of the armature body into a mounting position.

According to the disclosure, the method of assembling an armature for an electrical machine comprises the steps of (A) forming an armature body to comprise a number of interface elements;

(B) forming an armature ring segment to comprise a number of complementary interface elements;

(C) conveying an armature ring segment to a free ring segment portion of the armature body;

(D) aligning the interface elements of the armature ring segment with the interface elements of the armature body;

(E) inserting an insertion interface element into a complementary receiving interface element in a direction essentially parallel to a rotation axis of the armature to mount the armature ring segment onto the armature body;

and repeating steps (C), (D) and (E) until a desired number of armature ring segments have been mounted onto the armature body, whereby the steps need not necessarily be limited to the steps listed here, and whereby the order in which the steps are carried out may be varied.

Accordingly, this method is used to good effect in the assembly of an armature for a generator of a wind turbine, particularly in an assembly-line manufacturing process in which a plurality of generators are simultaneously assembled, since considerable time and cost can be saved by the simple and effective armature assembly and mounting technique described above.

Particularly advantageous embodiments and features are given by the dependent claims, as revealed in the following description. Features of different claim categories may be combined as appropriate to give further embodiments not described herein.

In the following, without restricting the invention in any way, it may be assumed that the armature is a stator for a generator, and the terms "armature" and "stator" may be used interchangeably. Also, without restricting the invention in any way, it may be assumed that the generator is for a wind turbine, and that the stator is mounted inside the rotor, i.e. the rotor comprises an outside rotor. During assembly of the armature, it may be assumed that the ring segments are mounted to the exterior of the armature. It may also be assumed that an armature ring segment is a radial ring segment, i.e. the armature ring segment occupies a radial fraction of an exterior circumferential curved plane of the armature.

A wind turbine comprising such an armature assembly can be manufactured at an overall lower cost, since the costs of the armature assembly comprises a major fraction of the overall assembly costs.

The expression "rotation axis of the armature" is to be understood as the axis about which a rotating part of the assembled generator will rotate. Usually, the generator exhibits rotational symmetry about its axis of rotation. The rotating part can be the armature itself, in which case the field magnet arrangement of the generator can be stationary. Alternatively, the armature itself does not rotate, as would be the case for a generator comprising a stationary armature and a rotating field magnet arrangement.

The armature handling apparatus according to the invention is realized to hold the armature body such that its rotation axis is vertical, and to rotate the entire armature body. To this end, the armature handling apparatus can comprises a suitable driving means such as a motor for driving the turning means by a predetermined amount. In this way, a free ring segment portion of a of the armature body can be presented at a convenient position.

In an embodiment of the invention, the armature handling apparatus comprises a ring segment handling means or lifting mechanism, with a gripping means for securely holding an armature ring segment as it is moved from a buffer and brought into position for mounting to the armature body. The ring segment handling means comprises an aligning means for aligning the armature ring segment relative to the free ring segment portion of the armature body, so that the interface elements of the armature body and the armature ring segment can mate.

The turning means of the armature handling apparatus can be controlled to turn the armature body by an amount corresponding to the width of a ring segment, so that the ring segment handling means or lifting mechanism can be controlled to always deliver a ring segment to the same position. In this way, the assembly of the armature can be carried out in a fast and efficient manner.

In an embodiment of the invention, an interface element is oriented along a longitudinal axis of the armature, and a corresponding interface element is oriented along a longitudinal axis of the armature ring segment. The "longitudinal axis" in this sense is to be understood as an axis running essentially parallel to the rotation axis of the armature. An armature ring segment can therefore simply be "slotted into" the armature body in a longitudinal direction, i.e. parallel to the axis of rotation of the armature. This is a considerable advantage in the mounting process, since the ring segments are generally designed to fit closely together about the armature body, and there is generally no lee-way for lateral movement of the ring segments, in particular for the final ring segment which must be inserted between two previously mounted ring segments, one on either side. Of course, the longitudinal orientation of an interface element does not in any way limit the shape or form of the interface element, as will become clear below.

The stator ring segment comprises a stop plate arranged to lie against a corresponding component of the armature body. Such a stop-plate can also be formed as an integral part of the steel ring segment bedplate, for example as a radial curved extension of the ring segment bedplate, arranged to extend in the direction of the rotation axis of the armature. In an embodiment of the invention, the stator ring segment comprises a first stop plate arranged to lie against a front plate of the armature, and a second stop plate arranged to lie against a back plate of the armature. These stop plates can define the axial position of the ring segment relative to the stator. The interface elements define the radial position of the ring segment relative to the stator, since these determine the points at which a ring segment is connected to the front plate and back plate.

The interface elements can have any appropriate design, and are designed to fit together in a relatively snug manner so that there is little or no "play" once the ring segment has been mounted on the stator. For example, in one embodiment, an insertion interface element comprises a pin, and a complementary receiving interface element comprises an opening such as a through-hole. The pin can be formed as an integral part, for example as part of a steel bedplate.

The insertion interface element can be formed on either the stator ring segment or the stator body. However, in an embodiment of the invention, the insertion interface element is formed on a stop plate of the armature ring segment.

A pair of interface elements also serves to some extent as a "point of suspension" for the ring segment, since the ring segment is effectively suspended from the armature body by, for example, the pins inserted into the through-openings in stator front plate and back plate. The weight of a stator segment is considerable, and the forces acting on such a point of suspension might lead to wear over time, and some loosening of the contact between the pin and the inside surfaces of the through-hole. Therefore, in an embodiment, an insertion interface element comprises a T-shaped shaft, and a complementary receiving interface element comprises a T-shaped slot. The increased surface area afforded by the T-shaped design can ensure that forces are distributed over a greater area, so that these points of suspension are more robust and reliable.

Since the stator ring element is large, unwieldy and generally very heavy, it may be difficult to align the interface elements exactly in order for these to engage, particularly since the insertion interface element should fit snugly in the receiving interface element. Therefore, in an embodiment, an insertion interface element comprises an alignment portion or guiding portion for aligning the insertion interface element relative to the complementary receiving interface element. For example, a T-shaped insertion interface element can also comprise a portion comprising only the "bar" or "stem" of the T, and this portion can be slotted first into the corresponding T-shaped slot. Subsequently, the rest of the T-shaped shaft can be slid into the T-shaped slot. In this way, mounting the ring segment correctly can be simplified, since it is only necessary to align the extended stem portion with the shaft, and the rest of the T-shaped slot will follow automatically when the ring segment is pushed or moved in the appropriate direction.

The mounting can be further simplified in another embodiment of the invention, in which the receiving interface element comprises a guiding means for guiding the insertion interface element into the complementary receiving interface element. For example, a T-shaped slot can comprise tapered wall portions at least in the outer regions of the stem portion, or a through-hole for a pin can comprise conical opening wall portions at least at the outer edges of the opening. Such guiding means can serve to "catch" the insertion interface element and to guide it into the receiving interface element.

In another embodiment, the ring segment can comprise longer insertion interface elements at one end, and normal or relatively shorter insertion interface element at the other end. For example, the insertion interface elements arranged at the ring segment stop plate that will be connected to the back plate might be longer than the insertion interface elements arranged at the ring segment stop plate that will be connected to the front plate. This arrangement can further facilitate ease of mounting and connecting. The mounting method can then comprise a first step of arranging the armature ring segment in a first orientation relative to the armature body to allow a longer first pair of interface elements to partially engage. For example, the ring segment can be held tilted relative to the back plate such that the insertion interface elements at the back plate end can engage partially. Then, the ring segment can be positioned to have it lie along to the stator body to align the interface elements at the front plate end. In a final step, the armature ring segment can be pushed or moved an appropriate distance to completely engage the first and second pairs of interface elements. This approach can be easier if the interface elements must be aligned visually.

Other features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
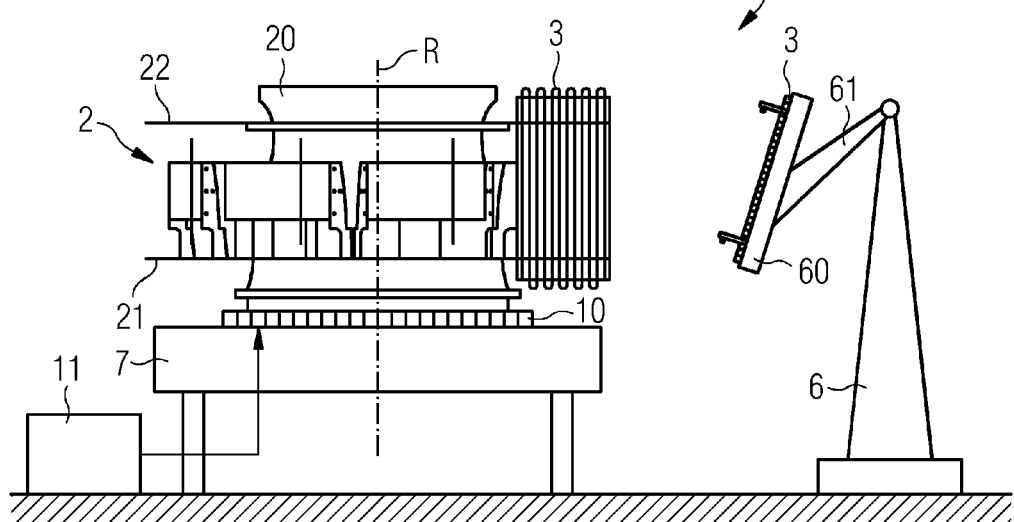
FIG. 1 shows an armature handling apparatus according to an embodiment of the invention.

FIG. 1 shows an armature handling apparatus 1 according to the invention, supporting a partially assembled armature 2 with an armature body 20, 21, 22 comprising a hollow shaft 20, a front plate 21 and a back plate 22. This kind of armature 2 can be mounted in the interior of an outside rotor for a generator of a direct drive wind turbine. The armature body 20, 21, 22 is mounted in a horizontal position on a turning means 10 arranged on a holding support 7, which turning means 10 can be turned to facilitate the assembly process. A motor 11 drives the turning means 10 so that a free ring segment portion is brought into position relative to a lifting mechanism 6. The diagram shows that one ring segment 3 has already been mounted onto the armature body 20, 21, 22, and a further armature ring segment 3 is being moved into position for mounting. The second ring segment 3 is grasped by a gripping means 60 of the lifting mechanism 6, which is equipped with a aligning means 61 that can move the gripping means 60 relative to the free ring segment portion of the armature body 20, 21, 22. The diagram also shows various components or modules for a cooling arrangement located between the front plate 21 and back plate 22 of the armature body.

Figure 2:
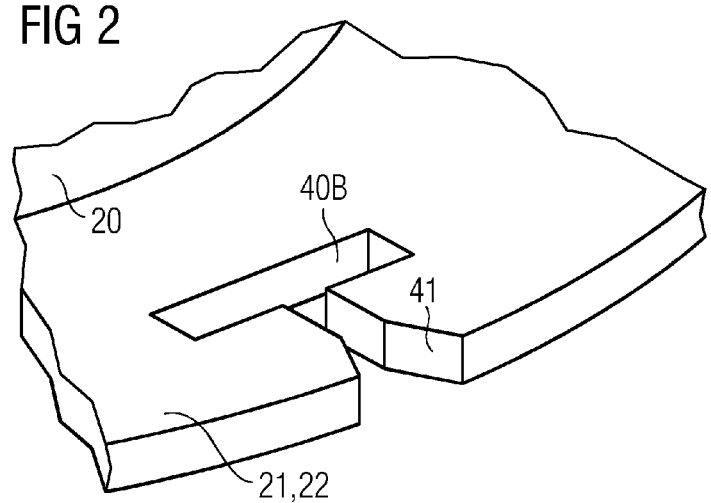
FIG. 2 shows a receiving interface element on the armature body of FIG. 1.

FIG. 2 shows a detail of a front plate 21 or a back plate 22 of a stator according to the invention. A receiving interface element 40B, in this case a T-shaped slot 40B, has been machined into the front plate 21 or the back plate 22. The "stem" of the T-shaped slot is arranged along a radius of the stator front plate 21 or a back plate 22. The T-shaped slot 40B has been machined to accommodate a corresponding T-shaped shaft of a ring segment, as will be explained in the following diagram. To facilitate engaging with a T-shaped shaft, an outer region of the shaft of the T-shaped slot 40B is tapered so that the outer end 41 of the opening 40B is wider than the width of the shaft stem further into the opening 40B.

Figure 3:
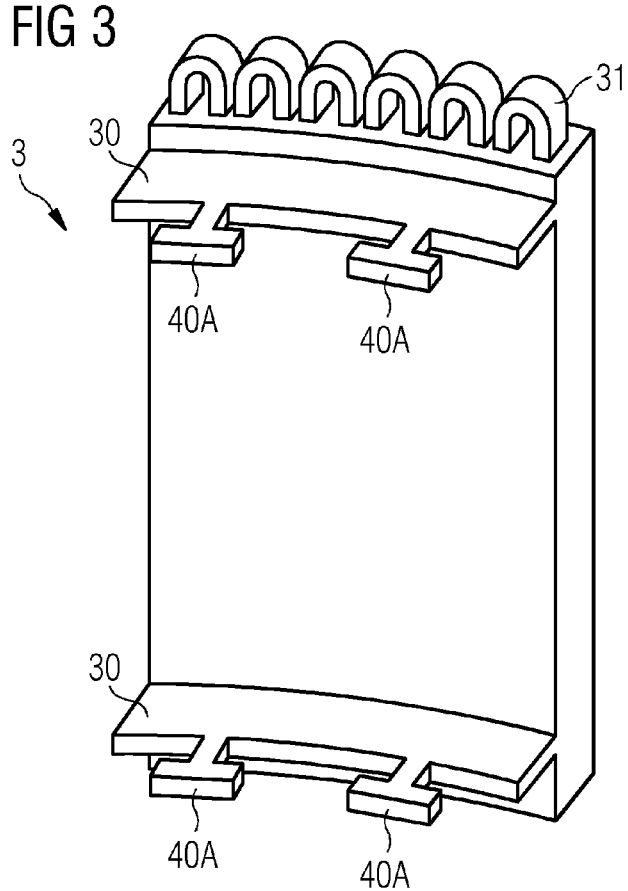
FIG. 3 shows an insertion interface element of the armature ring segment of FIG. 1.

FIG. 3 shows a detail of the stator ring segment of FIG. 1. Here, the ring segment 3 has two stop plates 30. The distance between the two stop plates 30 corresponds to the distance between the front plate 21 and the back plate 22 of the stator 2. In this embodiment, two T-shaped shafts 40A are formed integrally on each of the stop plates 30. Each T-shaped shaft 40A is shaped to fit snugly into a corresponding T-shaped slot 40B in the front plate 21 or back plate 22 of the stator 2, as described in FIG. 2 above. The ring segment 3 comprises a plurality of windings 31 arranged on its outer surface and encased in a fiberglass wrapping, indicated here in a very simplified manner.

Figure 4:
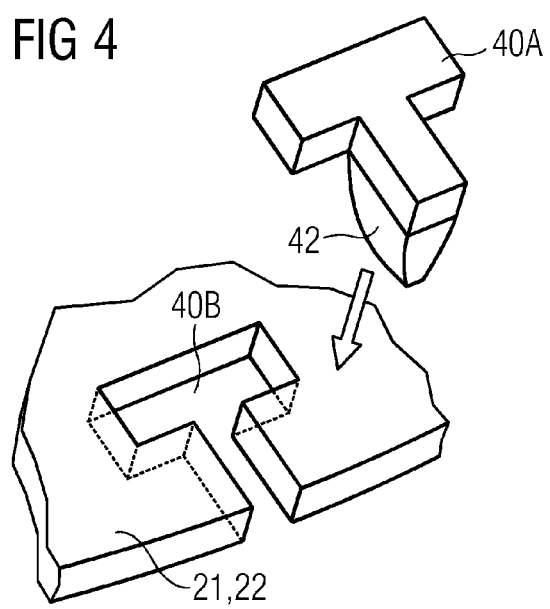
FIG. 4 shows a detail of an interface element pair of an armature body and an armature ring segment according to an embodiment of the invention.

FIG. 4 shows an alternative realization of an interface element pair 40A, 40B. Here, a T-shaped shaft 40A on a stop plate of the ring segment is augmented by an aligning portion 42 or guiding portion 42. For the sake of clarity, the stop plate and ring segment are not shown, but can be assumed to be as shown in FIG. 3 above. It can be assumed that the ring segment comprises two stop plates, each with two T-shaped shafts 40A as shown in FIG. 3 above. The T-shaped shafts 40A are brought into position relative to the corresponding T-shaped slots 40B, in the direction shown. Insertion of the interface elements is facilitated in this embodiment by the aligning portion 42, which serves to first engage with an outer opening of a shaft of the corresponding T-shaped slot 40B in a front plate 21 or back plate 22 of the stator. This embodiment can facilitate aligning a ring segment 3 against the armature body during mounting, particularly since the ring segment 3 is large and heavy and it may not always be easy to see whether the T-shaped shafts 40A are correctly meeting the corresponding T-shaped slots 40B. The aligning portion 42 can be realized integrally with the T-shaped shaft and the stop plate, and can also be tapered at its "front" region, which first engages with the T-shaft slot of the stator body.

Figure 5:
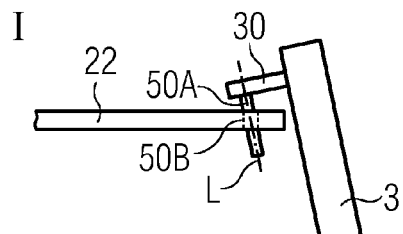
FIG. 5 shows a schematic representation of steps in the method.
Figure 5:
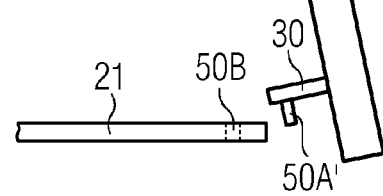
Figure 5:
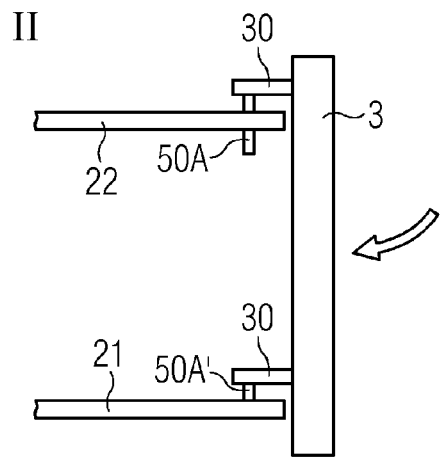

FIG. 5 is a schematic representation of steps in the method according to an embodiment of the invention. For the sake of clarity, the lifting mechanism is not shown, but it may be assumed that the ring segment 3 is being held by a gripping means of a lifting mechanism, and is being aligned relative to a free ring segment portion of the front plate 21 and back plate 22 of the armature body using the aligning means of the lifting mechanism. Here, the insertion interface elements 50A, 50A' are pins 50A, 50A' formed integrally on the stop plates 30 of a ring segment 3, so that these lie along a longitudinal axis L of the ring segment 3. The pins 50A' that will engage with corresponding through-openings 50B in the back plate 22 are longer than the pins 50A that will engage with corresponding openings 50B in the front plate 21. In a first mounting step, the ring segment 3 is held in a tilted orientation relative to the stator body 21, 22, so that only the longer pins 50A' can partially engage with the openings 40B in the back plate 22, and therefore only these interface elements 50A', 50B need be aligned. Once these pins 50A' are partially engaged with the openings 50B in the back plate 22, the ring segment 3 can be oriented so that a longitudinal axis L is parallel to the axis of rotation R of the stator 2, and in doing so, the other pins 50A are automatically aligned with the openings in the front plate 21. In a final step, the ring segment 3 is allowed to "drop" slightly so that the pairs of interface elements completely engage. In a final step, fasteners 32 can be inserted through corresponding holes in the stop plates 30, front plate 21 and back plate 22 of the stator 2 to secure the ring segments 3.

Although the present invention has been disclosed in the form of embodiments and variations thereon, it will be understood that numerous additional modifications and variations could be made thereto without departing from the scope of the invention. The ring segments might be formed to have different types of insertion interface elements on the first and second stop plates, for example, using the realizations described above; a ring segment might have one or more T-shaped shafts on one stop plate and one or more pins on the other stop plate.

For the sake of clarity, it is to be understood that the use of "a" or "an" throughout this application does not exclude a plurality, and "comprising" does not exclude other steps or elements.

The invention claimed is:

1. An armature assembly comprising:
    an armature body having a hollow shaft, a front plate and a back plate, and a number of armature ring segments mounted on the armature body, wherein the armature assembly comprises a number of insertion interface elements and a number of complementary receiving interface elements or mounting an armature ring segment onto the front plate and the back plate of the armature body; wherein an insertion interface element of the insertion interface elements is realized to engage with a complementary receiving interface element of the complementary receiving interface elements in a direction essentially parallel to a rotation axis of the armature assembly; and wherein the insertion interface element is formed as an integral part of the front plate or the back plate of the armature body, and a complementary interface element is formed as an integral part of a stop plate of an armature ring segment.

2. The armature assembly according to claim 1, wherein the insertion interface element is oriented along a longitudinal axis of the armature body, and the complementary receiving interface element is oriented along a longitudinal axis of the armature ring segment.

3. The armature assembly according to claim 1, wherein the insertion interface element comprises a T-shaped shaft, and the complementary receiving interface element comprises a T-shaped slot.

4. The armature assembly according to claim 1, wherein the insertion interface element comprises a pin, and the complementary receiving interface element comprises an opening.

5. The armature assembly according to claim 1, wherein the armature ring segment comprises a first stop plate arranged to lie against a front plate of the armature assembly, and a second stop plate arranged to lie against a back plate of the armature assembly.

6. The armature assembly according to claim 1, wherein the insertion interface element comprises an alignment portion for aligning the insertion interface element relative to the complementary receiving interface element.

7. The armature assembly according claim 1, wherein the receiving interface element comprises a guiding means for guiding the insertion interface element into the receiving interface element.

8. An armature ring segment comprising:
    a first stop plate arranged to lie against a front plate of an armature body;
    a second stop plate arranged to lie against a back plate of the armature body; and
    at least one insertion interface element formed as an integral part of a stop plate and realized to be inserted into a complementary receiving interface element in the front plate or back plate of the armature body in a direction essentially parallel to a rotation axis of the armature.

9. The armature body comprising a hollow shaft, a front plate and a back plate; and a number of complementary receiving interface elements wherein a receiving interface element is formed as an integral part of the front plate or the back plate for receiving a number of insertion interface elements of the armature ring segments according to claim 8, such that the armature ring segments are mounted to the armature body by the complementary interface elements.

10. An armature handling apparatus, comprising
    an armature holding apparatus realized to hold the armature body according to claim 9 such that a rotation axis of the armature body is essentially vertical; and
    a turning means realized to turn the armature body about the rotation axis to bring a free ring segment portion of the armature body into a mounting position.

11. The armature handling apparatus according to claim 10, comprising a ring segment handling means, which ring segment handling means comprises a gripping means for holding the armature ring segment and an aligning means for aligning the armature ring segment relative to the free ring segment portion of the armature body.

* * * * *

UNITED STATES PATENT AND TRADEMARK OFFICE
CERTIFICATE OF CORRECTION

PATENT NO. : 9,583,981 B2  Page 1 of 1
APPLICATION NO. : 14/364341
DATED : February 28, 2017
INVENTOR(S) : Torben Peter Andersen et al.

It is certified that error appears in the above-identified patent and that said Letters Patent is hereby corrected as shown below:

In the Claims

Column 7, Line 60, please change "or" to --for--

Signed and Sealed this
First Day of August, 2017

Joseph Matal
*Performing the Functions and Duties of the*
*Under Secretary of Commerce for Intellectual Property and*
*Director of the United States Patent and Trademark Office*